(12) United States Patent
Takanohashi

(10) Patent No.: US 6,223,525 B1
(45) Date of Patent: May 1, 2001

(54) AIR-FUEL RATIO CONTROLLING DEVICE FOR AN INTERNAL COMBUSTION ENGINE

(75) Inventor: Toshikatsu Takanohashi, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/328,002

(22) Filed: Jun. 8, 1999

(30) Foreign Application Priority Data

Jun. 24, 1998 (JP) .................................................. 10-177069

(51) Int. Cl.[7] ...................................................... F01N 3/00
(52) U.S. Cl. ................. 60/285; 60/286; 60/295; 60/301
(58) Field of Search ............................. 60/285, 286, 295, 60/301

(56) References Cited

U.S. PATENT DOCUMENTS

| | | | |
|---|---|---|---|
| 5,381,657 | * | 1/1995 | Takizawa et al. ................ 60/285 |
| 5,412,945 | * | 5/1995 | Katoh et al. ..................... 60/285 |
| 5,437,153 | * | 8/1995 | Takeshima et al. .............. 60/286 |
| 5,551,231 | * | 9/1996 | Tanaka et al. ................... 60/301 |
| 5,713,199 | * | 2/1998 | Takeshima et al. .............. 60/285 |
| 5,715,679 | * | 2/1998 | Asanuma et al. ................ 60/285 |
| 5,735,119 | * | 4/1998 | Asanuma et al. ................ 60/285 |
| 5,894,725 | * | 4/1999 | Cullen et al. ................... 60/301 |
| 5,953,907 | * | 9/1999 | Kato et al. ...................... 60/276 |
| 5,956,948 | * | 9/1999 | Nagashiam et al. ............. 60/297 |
| 5,979,161 | * | 11/1999 | Hanafusa et al. ............... 60/276 |
| 5,992,144 | * | 11/1999 | Takanohashi et al. ........... 60/285 |

* cited by examiner

*Primary Examiner*—Thomas Denion
*Assistant Examiner*—Diem Tran
(74) *Attorney, Agent, or Firm*—Sughrue, Mion, Zinn, Macpeak & Seas, PLLC

(57) ABSTRACT

In accordance with an output of an oxygen concentration sensor 16, an air-fuel ratio correction coefficient KO2 is periodically set to values respectively corresponding to a leaner air-fuel ratio and a richer air-fuel ratio with respect to a theoretical air-fuel ratio (steps S22 to S28). Based on an output of an oxygen concentration sensor 16, a NOx amount counter nNOx is counted up, and the amount of NOx absorbed by a NOx absorbent catalyst is estimated. When the value of the NOx amount counter nNOx reaches a preset value NSAT, an air-fuel ratio of an air-fuel mixture is set to be further richer than the richer air-fuel ratio.

3 Claims, 4 Drawing Sheets

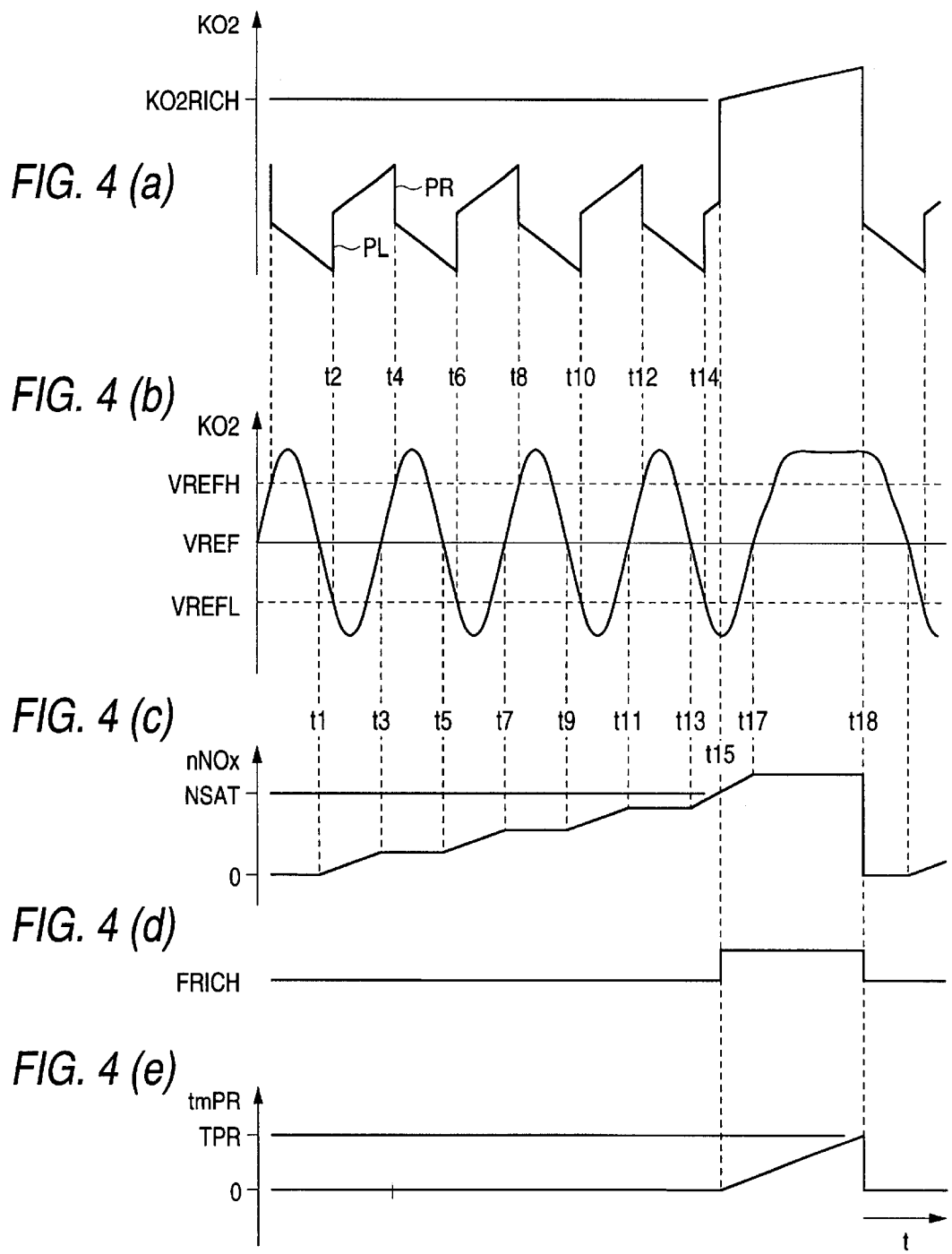

AIR-FUEL RATIO CONTROLLING DEVICE FOR AN INTERNAL COMBUSTION ENGINE

BACKGROUND OF THE INVENTION

1. Field of the Invention

The present invention relates to an air-fuel ratio controlling device for an internal combustion engine, and particularly to an air-fuel ratio controlling device for an internal combustion engine having an exhaust system which is provided with a NOx (nitrogen oxide) absorbent catalyst.

2. Description of the Related Art

When the lean operation is executed in such a way that the air-fuel ratio of an air-fuel mixture to be supplied to an internal combustion engine is set to be on the lean side with respect to a theoretical air-fuel ratio, the output amount of NOx tends to be increased.

Conventionally, a technique is therefore known in which a NOx absorbent catalyst that absorbs NOx is disposed in an exhaust gas passage of an engine so as to purify an exhaust gas. Such a NOx absorbent catalyst has properties such that, in a state where the air-fuel ratio is set to be on the lean side with respect to a theoretical air-fuel ratio and the oxygen concentration in the exhaust gas is relatively high (NOx is rich) (hereinafter, referred to as "exhaust gas-lean state"), the catalyst absorbs NOx, and, on the other hand, in a state where the air-fuel ratio is set to be on the rich side with respect to the theoretical air-fuel ratio, the oxygen concentration in the exhaust gas is low, and the HC and CO components are large (hereinafter, referred to as "exhaust gas-rich state"), the catalyst releases NOx which has been absorbed.

Conventionally, an air-fuel ratio controlling device is known in which such a NOx absorbent catalyst is disposed together with a three-way catalyst in an exhaust gas passage of an engine and the air-fuel ratio of an air-fuel mixture is periodically controlled to be on the leaner side and the richer side with respect to a theoretical air-fuel ratio (Japanese Patent No. 2,605,579). In the device, in view of a phenomenon that, when the air-fuel ratio is set to be on the leaner side with respect to the theoretical air-fuel ratio, the NOx purification rate of the three-way catalyst is lowered, the NOx absorbent catalyst is placed downstream from the three-way catalyst so as to absorb NOx.

In a device of the related arts, however, no consideration is given on reduction (release) of NOx which has been absorbed by the NOx absorbent catalyst, and hence there is the following problem.

When the air-fuel ratio is to be controlled so as to be in the vicinity of the theoretical air-fuel ratio, an air-fuel ratio on the richer side with respect to the theoretical air-fuel ratio is set a value at which HC and CO can be purified by means of the purification property of the three-way catalyst. On the downstream side of the three-way catalyst, therefore, the exhaust gas-rich state is not attained usually. Consequently, the reduction of the absorbed NOx in the NOx absorbent catalyst is insufficiently performed, thereby there is such a problem that the NOx absorption ability is gradually lowered and the output amount of NOx is increased.

SUMMARY OF THE INVENTION

The invention has been conducted in order to solve the problem. It is an object of the invention to provide an air-fuel ratio controlling device which, when an air-fuel ratio of an air-fuel mixture to be supplied to an internal combustion engine with a NOx absorbent catalyst, being disposed in an exhaust system, is controlled by setting said ratio in the vicinity of a theoretical air-fuel ratio, the NOx absorption ability of the NOx absorbent catalyst can be maintained so as to prevent the output amount of NOx from being increased.

In order to achieve the object, one of the embodiments of this invention is an air-fuel ratio controlling device for an internal combustion engine, comprising: a NOx absorbent catalyst which is disposed in an exhaust system of an internal combustion engine, and which, in an exhaust gas-lean state, absorbs NOx in an exhaust gas, and, in an exhaust gas-rich state, reduces NOx which has been absorbed; air-fuel ratio detecting means which is disposed in the exhaust system; and air-fuel ratio controlling means for changing an air-fuel ratio of an air-fuel mixture to be supplied to the engine, to a leaner air-fuel ratio or a richer air-fuel ratio with respect to a theoretical air-fuel ratio, and is characterized in that the air-fuel ratio controlling device further comprises: NOx amount estimating means for, based on an output of the air-fuel ratio detecting means, estimating an amount of NOx absorbed in the NOx absorbent catalyst; and air-fuel ratio enriching means for, when the NOx amount estimated by the NOx amount estimating means reaches a preset value, enriching the air-fuel ratio of the air-fuel mixture to a value which is richer than the richer air-fuel ratio.

In the specification, the term "preset value" means a value corresponding to the NOx amount in the case where a NOx absorbent catalyst absorbs NOx to the limit of its NOx absorption ability, or that which is slightly smaller than the value.

According to this configuration, the air-fuel ratio of the air-fuel mixture to be supplied to the engine is set to a leaner air-fuel ratio or a richer air-fuel ratio with respect to a theoretical air-fuel ratio, and the amount of NOx absorbed in the NOx absorbent catalyst is estimated based on the output of the air-fuel ratio detecting means. When the estimated NOx amount reaches the preset value, the air-fuel ratio of the air-fuel mixture is set to be made richer than the richer air-fuel ratio. Therefore, NOx which has been absorbed by the NOx absorbent catalyst is appropriately reduced, so that the output amount of NOx can be prevented from being increased, while maintaining the NOx absorption ability.

BRIEF DESCRIPTION OF THE DRAWINGS

FIG. 4(a)–(e) is a time chart illustrating controls in the processes of FIGS. 2 and 3.

DESCRIPTION OF THE PREFERRED EMBODIMENTS

Hereinafter, an embodiment of the invention will be described with reference to the accompanying drawings.

Figure 1:
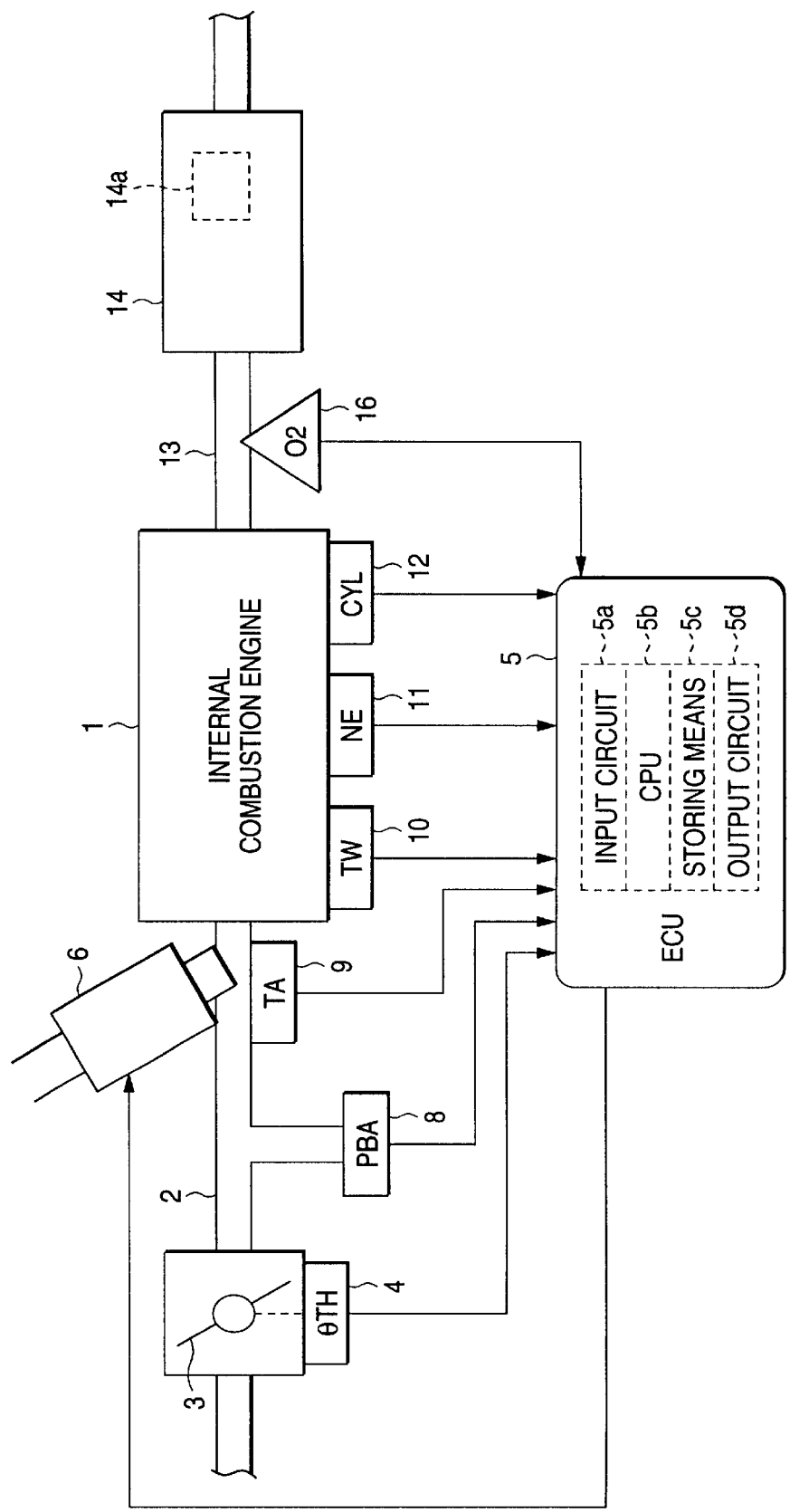
FIG. 1 is a diagram showing the configuration of an internal combustion engine and an air-fuel ratio controlling device for the engine according to an embodiment of the invention.

FIG. 1 is a diagram showing the whole configuration of an internal combustion engine (hereinafter, referred to merely as "engine") and an air-fuel ratio controlling device for the engine according to an embodiment of the invention. A throttle valve 3 is disposed in the midway of a suction pipe 2 of the engine 1 which has, four example, four cylinders. A throttle valve opening (θTH.) sensor 4 is coupled to the throttle valve 3, so as to output an electric signal corresponding to the opening of the throttle valve 3. The signal is supplied to an engine electronic control unit (hereinafter, abbreviated as "ECU") 5.

A fuel injection valve 6 is disposed for each cylinder, between the engine 1 and the throttle valve 3 and in a portion of the suction pipe 2 which is slightly upstream from an inlet valve (not shown). Each injection valve 6 is connected to a fuel pump which is not shown, and also the ECU 5, so that the opening time of the fuel injection valve 6 is controlled by a control signal from the ECU 5.

A suction pipe absolute pressure (PBA) sensor 8 is disposed downstream of just next to the throttle valve 3. An absolute pressure signal which is converted into an electric signal by the absolute pressure sensor 8 is supplied to the ECU 5. A suction air temperature (TA) sensor 9 is attached downstream of the absolute pressure sensor, so as to detect the suction air temperature TA and output an electric signal corresponding to the temperature. The signal is supplied to the ECU 5.

An engine water temperature (TW) sensor 10 mounted on the body of the engine 1 consists of a thermistor or the like, so as to detect the engine water temperature (cooling water temperature) TW and output a temperature signal corresponding to the temperature. The signal is supplied to the ECU 5.

An engine revolution number (NE) sensor 11 and a cylinder judgment (CYL) sensor 12 are attached to the peripheries of a cam shaft and a crank shaft of the engine 1 which are not shown. The engine revolution number sensor 11 outputs a TDC signal pulse at a crank angle position (in a four-cylinder engine, for each crank angle of 180°) which leads by a predetermined crank angle the top dead center (TDC) at the start of the suction stroke of each cylinder of the engine 1. The cylinder judgment sensor 12 outputs a cylinder judgment signal pulse at a predetermined crank angle position of a specific cylinder. The signal pulses are supplied to the ECU 5.

An exhaust gas purifier 14 which houses a three-way catalyst and a NOx absorbent catalyst 14a is disposed in an exhaust pipe 13. The three-way catalyst has an oxygen storage capacity. The three-way catalyst has functions of, in an exhaust gas-lean state where the air-fuel ratio of an air-fuel mixture to be supplied to the engine 1 is set to be on the lean side with respect to a theoretical air-fuel ratio and the oxygen concentration in the exhaust gas is relatively high, storing, and, in an exhaust gas-rich state where the air-fuel ratio of the air-fuel mixture is set to be on the rich side with respect to the theoretical air-fuel ratio, the oxygen concentration in the exhaust gas is low, and the HC and CO components are large, oxidizing HC and CO in the exhaust gas by the stored oxygen.

The NOx absorbent catalyst 14a consists of a NOx absorbing agent and a catalyst. As the NOx absorbing agent, either an absorption type agent or an adsorption type agent might be used. The absorption type agent has such properties that, in the exhaust gas-lean state, the agent stores NOx and, in the exhaust gas-rich state, it releases said stored Nox. On the other hand, the adsorption type agent has such properties that, in the exhaust gas-lean state, the agent adsorbs NOx, and, in the exhaust gas-rich state, it reduces NOx. The NOx absorbent catalyst 14a is configured so that, in the exhaust gas-lean state, the NOx absorbing agent absorbs NOx, and, in the exhaust gas-rich state, NOx which has been absorbed by the NOx absorbing agent is reduced by HC and CO to be discharged as a nitrogen gas, and HC and CO are oxidized to be discharged as water vapor and carbon dioxide. For example, barium oxide (BaO) is used as the NOx absorbing agent of the absorption type, and sodium (Na) and titanium (Ti), or strontium (Sr) and titanium (Ti) are used as the NOx absorbing agent of the adsorption type. In both the cases of the absorption type and the adsorption type, for example, platinum (Pt) is used as the catalyst. Generally, the NOx absorbing agent has such a property that absorbed NOx is released more readily as the temperature is higher.

An oxygen concentration sensor 16 (hereinafter, referred to as "O2 sensor 16") serving as the air-fuel ratio detecting means is placed in a position upstream from the exhaust gas purifier 14. The O2 sensor 16 detects the oxygen concentration in the exhaust gas, and outputs an electric signal corresponding to the detection value. The signal is supplied to the ECU 5.

The ECU 5 comprises: an input circuit 5a having functions such as those of shaping the waveform of each of signals supplied from various sensors, correcting the voltage level to a predetermined level, and converting an analog signal value into a digital signal value; a central processing unit (hereinafter, abbreviated as "CPU") 5b; storing means 5c for storing various calculation programs which are to be executed in the CPU 5b, results of the calculation, and the like; and an output circuit 5d which supplies a drive signal to the fuel injection valves 6. The storing means 5c has a back up memory which, even when the ignition switch is turned off, is battery backed to hold the stored contents.

On the basis of the above-mentioned engine parameter signals, the CPU 5b judges various engine operation conditions such as an air-fuel ratio feedback control region in which the air-fuel ratio is controlled in accordance with the oxygen concentration in the exhaust gas, and an open loop control region in which the air-fuel ratio feedback control is not conducted, and, in accordance with the judged engine operation condition, calculates the fuel injection time TOUT of each fuel injection valve 6 synchronized with the TDC signal pulse, according to expression (1) below.

$$TOU = TIM \times KO2 \times K1 + K2 \quad (1)$$

In the expression TIM is a basic fuel amount, or specifically a basic fuel injection time of the fuel injection valve 6. The amount is determined by searching a TI map which is set in accordance with the engine revolution number NE and the suction pipe absolute pressure PBA. The TI map is set so that the air-fuel ratio of the air-fuel mixture which is to be supplied to the engine is substantially equal to the theoretical air-fuel ratio, under the operation condition corresponding to the engine revolution number NE and the suction pipe absolute pressure PBA.

KO2 is an air-fuel ratio correction coefficient (hereinafter, referred to merely as "correction coefficient). In the air-fuel ratio feedback control, the correction coefficient is obtained in accordance with the oxygen concentration in the exhaust gas which is detected by the O2 sensor 16. In the open loop control region, the correction coefficient is set to a value corresponding to the respective operation region.

K1 and K2 are another correction coefficient and a correction variable which are calculated in accordance with the various engine parameter signals, respectively, and determined to predetermined values at which various properties including the fuel consumption property and the engine acceleration property that correspond to the engine operation condition can be optimized.

On the basis of the thus obtained fuel injection time TOUT, the CPU 5b supplies the drive signal for driving the fuel injection valves 6, via the output circuit 5d to the fuel injection valves 6.

Figure 2:
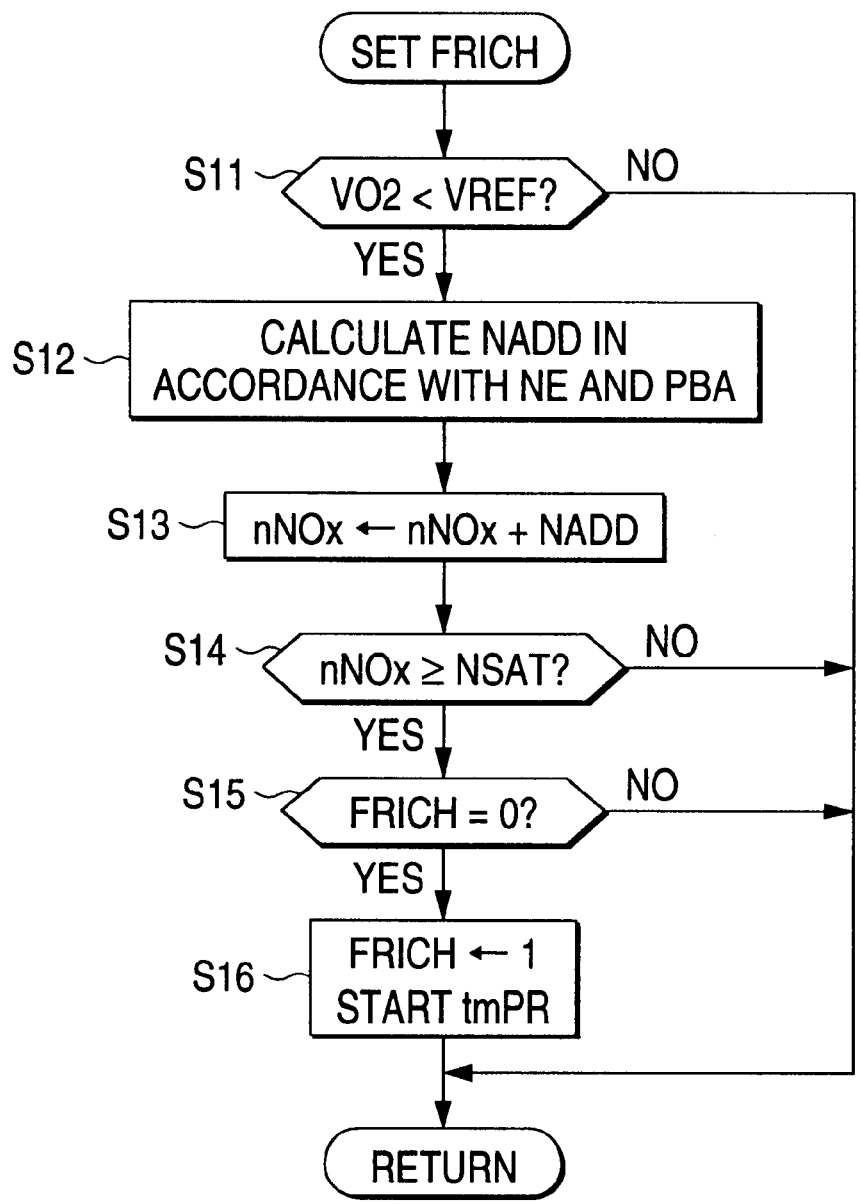
FIG. 2 is a flowchart of a process of setting an enrichment flag (FRICH).

FIG. 2 is a flowchart of a process of setting an enrichment flag FRICH in which "1" indicates that the air-fuel ratio is to be enriched in order to reduce NOx absorbed by the NOx absorbent catalyst 14a in the exhaust gas purifier 14. The process is executed by the CPU 5b at constant periods (for example, 10 msec.).

In step S11, it is judged whether an output VO2 of the O2 sensor is lower than a reference value VREF which substantially corresponds to the theoretical air-fuel ratio or not. If VO2>VREF, the process is immediately ended. If VO2<VREF and the air-fuel ratio is on the leaner side with respect to the theoretical air-fuel ratio, an addition term NADD is calculated in accordance with the engine revolution number NE and the suction pipe absolute pressure PBA (step S12). The addition term NADD is a parameter corresponding to the amount of NOx which is discharged per unit time during a period when the air-fuel ratio is set to be on the leaner side with respect to the theoretical air-fuel ratio. The addition term is set to be larger as the engine revolution number NE is larger and the suction pipe absolute pressure PBA is larger.

In step S13, the addition term NADD which is calculated in step S12 is applied to the expression below so as to increment a NOx amount counter nNOx. As a result, a count value corresponding to the NOx discharge amount is obtained.

$$nNOx \times nNOx + NADD$$

In step S14, it is judged whether the value of the NOx amount counter nNOx is not smaller than a preset value NSAT or not. If nNOx<NSAT, the process is immediately ended. If nNOx>NSAT, it is judged whether the enrichment flag FRICH is already set to "1" or not (step S15). At first, the enrichment flag FRICH=0. Therefore, the flag is set to "1" and an up-count timer tmPR which counts the time of executing the enrichment is then started (step S16). Thereafter, the process is ended. In a subsequent process, when the control reaches step S15, FRICH=1 is already set, and hence the process is immediately ended.

The preset value NSAT is a value corresponding to the NOx amount in the case where the NOx absorbent catalyst 14a absorbs NOx to the limit of its NOx absorption ability, or that which is slightly smaller than the value.

As a result of this process, the amount of NOx which is discharged during the period when the air-fuel ratio is set to be on the leaner side with respect to the theoretical air-fuel ratio is summed up by the NOx amount counter nNOx, and the amount of NOx absorbed in the NOx absorbent catalyst 14a in the exhaust gas purifier 14 is estimated. When the value of the counter nNOx reaches the preset value NSAT and NOx is absorbed to an amount which is approximately equal to the limit of the absorption ability of the NOx absorbent catalyst 14a, the enrichment flag FRICH is set to "1."

Figure 3:
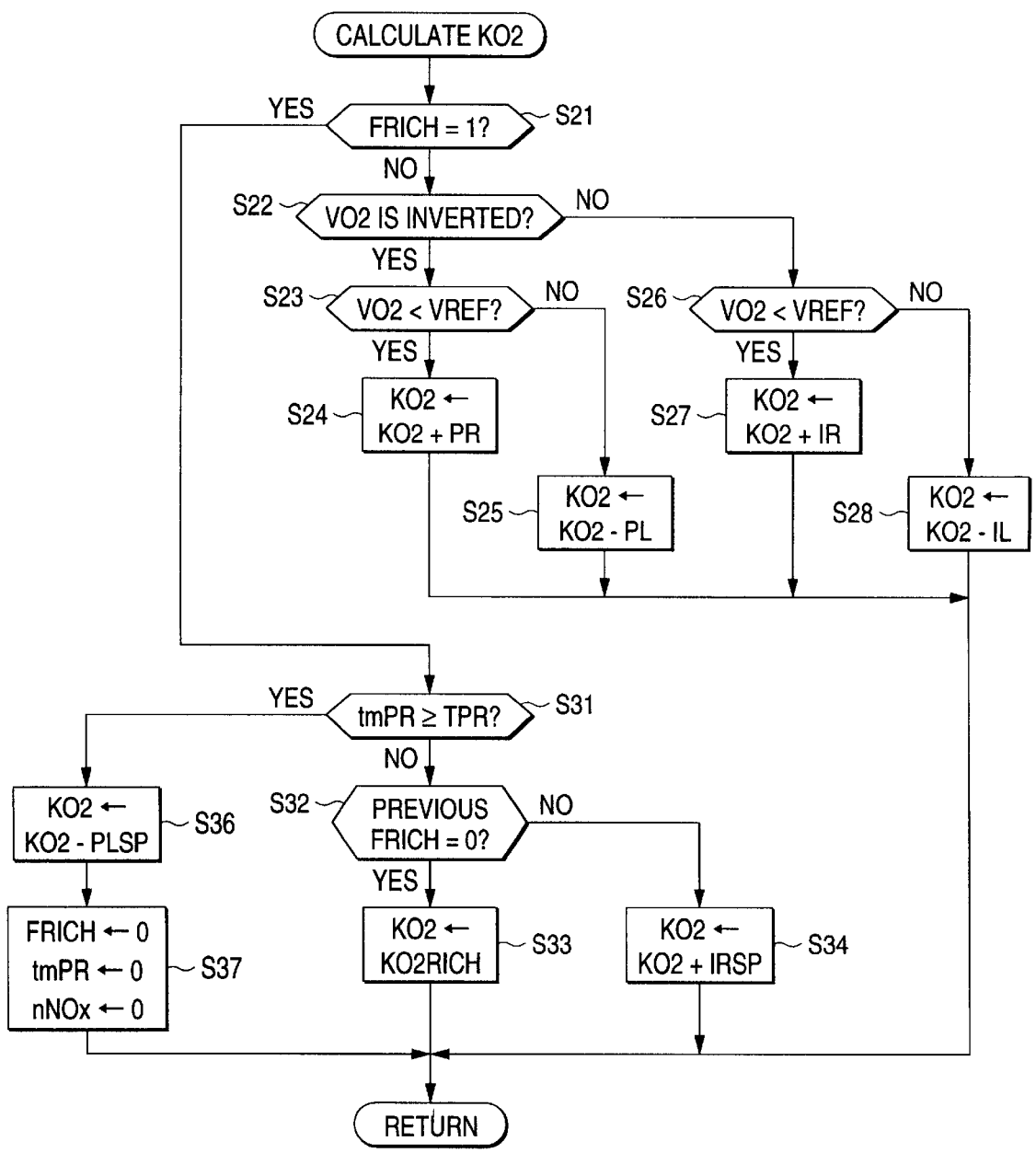
FIG. 3 is a flowchart of a process of calculating an air-fuel ratio correction coefficient KO2.

FIG. 3 is a flowchart of a KO2 feedback control process in which the correction coefficient KO2 is calculated in accordance with the output of the O2 sensor 16. This process is executed by the CPU 5b in synchronization with the generation of the TDC signal pulse.

In step S21, it is judged whether the enrichment flag FRICH is "1" or not. If FRICH=0, the control advances to step S22 in order to execute a usual feedback control, and it is judged whether the level relationship between the output VO2 of the O2 sensor and the reference value VREF is inverted or not. This judgment is conducted in the following manner. In the embodiment, hysteresis is formed, so that, when the output VO2 of the O2 sensor is increasing, it is judged that the level relationship is inverted, at the timing when the output VO2 exceeds an upper reference value VREFH (>VREF), and, when the output VO2 of the O2 sensor is decreasing, it is judged that the level relationship is inverted, at the timing when the output VO2 becomes lower than a lower reference value VREFL (<VREF) (see FIG. 4(b)).

When the level relationship between the output VO2 of the O2 sensor and the reference value VREF is inverted, i.e., at the timing of updating due to a proportional term PR or PL, it is judged whether the output VO2 is smaller than the reference value VREF or not (step S23). If VO2>VREF as a result of the judgment, the correction coefficient KO2 is updated by subtracting the proportional term PL from the correction coefficient (step S25), and the process is then ended.

When the level relationship is not inverted, it is judged in step S26 whether the output VO2 of the O2 sensor is smaller than the reference value VREF or not. If VO2<VREF, the correction coefficient KO2 is updated by adding an integration term IR to the correction coefficient (step S27). If VO2>VREF, the correction coefficient KO2 is updated by subtracting an integration term IL from to the correction coefficient (step S28). Thereafter, the process is ended.

When the enrichment flag FRICH is set to "1" as a result of the process of FIG. 2, the control advances from step S21 to step S31 to judge whether the value of the timer tmPR exceeds a predetermined time TPR (for example, 1 sec.) or not. At first, tmPR<TPR, and hence it is judged whether the enrichment flag FRICH in the previous execution of the process is "0" or not (step S32). At first, the result of this judgment is YES, and hence the correction coefficient KO2 is set to a enrichment predetermined value KO2RICH (for example, a value corresponding to an air-fuel ratio of 13.5) (step S33). Thereafter, the process is ended.

In the next judgment, the result of step S32 is NO. Therefore, the control advances to step S34 to update the correction coefficient KO2 by adding an integration term IRSP which is smaller than the integration term IR used in step S27, to the correction coefficient, and the process is then ended. Hereinafter, as far as tmPR<TPR, step S34 is repeatedly executed.

If it is judged in step S31 that tmPR≧TPR, the correction coefficient KO2 is updated by subtracting a proportional term PLSP (>PL) from the correction coefficient (step S36). In order to end the enrichment process, the enrichment flag FRICH is set to "0," and the values of both the timer tmPR and the counter nNOx are reset to "0" (step S33), and the process is then ended.

Preferably, the predetermined time TPR is set to be in the vicinity of a value at which a substantially whole amount of NOx absorbed by the NOx absorbent catalyst 14a can be reduced.

FIG. 4 is a time chart illustrating the processes of FIGS. 2 and 3. In the figure, (a) to (e) show changes of the correction coefficient KO2, the output VO2 of the O2 sensor, the value of the NOx amount counter nNOx, and the values of the enrichment flag FRICH and the timer tmPR, respectively. The figure shows an example in which the counting of the NOx amount counter nNOx is started at time t1.

At times t2, t4, t6, t8, t10, t12, and t14, the inversion of the level relationship between the output VO2 of the O2 sensor and the reference value VREF is judged while providing hysteresis, and hence the correction coefficient KO2 is updated with using the proportional term PR or PL. In the periods between the times, the correction coefficient KO2 is updated with using the integration term IR or IL. During such a normal feedback control, the maximal value of the correction coefficient KO2 is a value approximately corresponding to an air-fuel ratio of 14.5, and the minimal value is a value approximately corresponding to an air-fuel ratio of 14.9. The air-fuel ratio of the air-fuel mixture which is to be supplied to the engine is controlled so as to be changed between a leaner air-fuel ratio and a richer air-fuel ratio with respect to the theoretical air-fuel ratio (14.7), and in the vicinity of the theoretical air-fuel ratio (for example, a range of 14.5 to 14.9).

During a period when VO2<VREF (periods of t1 to t3, t5 to t7, t9 to t11, and t13 to 17), the NOx amount counter nNOx is counted up, and, during a period when VO2>VREF (periods of t3 to t5, t7 to t9, t11 to t13, and t17 to 18), the value of the counter is held.

At time t15, the value of the NOx amount counter nNOx reaches the preset value NSAT. Therefore, the enrichment flag FRICH is set to "1," and the timer tmPR is started. Since the enrichment flag FRICH is set to "1," the correction coefficient KO2 is set to the enrichment predetermined value KO2RICH, i.e., a value corresponding to an air-fuel ratio of 13.5 which is on the richer side with respect to a value corresponding to a air-fuel ratio that is the maximal value in a usual feedback control. Thereafter, the correction coefficient is controlled so as to be gradually increased by the integration term IRSP.

At time t18, the value of the timer tmPR reaches the predetermined time TPR. Therefore, the enrichment flag FRICH is returned to "0," and the correction coefficient KO2 is returned by a special proportional term ILSP, to a usual value which is approximately in the vicinity of the theoretical air-fuel ratio. At this time, also the NOx amount counter nNOx and the timer tmPR are reset to "0."

As described above, in the embodiment, when the air-fuel ratio is on the leaner side with respect to a theoretical air-fuel ratio during a usual air-fuel ratio feedback control, the amount of NOx absorbed in the NOx absorbent catalyst 14a is estimated by using the NOx amount counter nNOx, and, when the count value reaches the preset value NSAT, the air-fuel ratio is set to a value which is further richer than the richer air-fuel ratio for the usual feedback control. Consequently, the exhaust gas-rich state where the HC and CO components are large in the exhaust gas is attained, so that NOx absorbed in the NOx absorbent catalyst is reduced. As a result, the output amount of NOx can be prevented from being increased, while maintaining the NOx absorption ability.

In the embodiment, steps S22 to S28 of FIG. 3 correspond to the air-fuel ratio controlling means, steps S11 to S13 of FIG. 2 to the NOx amount estimating means, and steps S14 to S16 of FIG. 2 and steps S21 and S31 to S37 of FIG. 3 to the air-fuel ratio enriching means.

The invention is not restricted to the embodiment described above, and may be variously modified. In the embodiment described above, in accordance with the output VO2 of the O2 sensor, the air-fuel ratio of the air-fuel mixture which is to be supplied to the engine 1 is controlled to a leaner air-fuel ratio or a richer air-fuel ratio with respect to the theoretical air-fuel ratio by the air-fuel ratio feedback control using the proportional terms and the integration terms. Alternatively, the correction coefficient KO2 may be periodically controlled to a value on the leaner side with respect to the theoretical air-fuel ratio and that on a leaner side, by a feedback control using the proportional terms or the integration terms, or an open loop control.

The invention is effective in the case where a richer air-fuel ratio with respect to a theoretical air-fuel ratio in the variable control has a value at which HC and CO concentrations in the position of the NOx absorbent catalyst 14a are not sufficiently high for rapidly reducing NOx.

In the embodiment described above, during a period when FRICH=1, the correction coefficient KO2 is updated in the increasing direction by the integration term IRSP. Alternatively, the correction coefficient may be held to the enrichment predetermined value KO2RICH.

In the embodiment described above, the three-way catalyst and NOx absorbent catalyst are integrated to each other so as to configure the exhaust gas purifier 14. Alternatively, a three-way catalyst housing unit which houses a three-way catalyst, and a NOx absorbent catalyst housing unit which houses a NOx absorbent catalyst might be separately formed, and the NOx absorbent catalyst housing unit might be placed downstream from the three-way catalyst housing unit.

As described above in detail, according to the invention, the air-fuel ratio of the air-fuel mixture to be supplied to the engine is set to a leaner air-fuel ratio or a richer air-fuel ratio with respect to a theoretical air-fuel ratio, and the amount of NOx absorbed in the NOx absorbent catalyst is estimated based on the output of the air-fuel ratio detecting means. When the estimated NOx amount reaches the preset value, the air-fuel ratio of the air-fuel mixture is set to be made richer than the richer air-fuel ratio. Therefore, NOx which has been absorbed by the NOx absorbent catalyst is appropriately released, so that the output amount of NOx can be prevented from being increased, while maintaining the NOx absorption ability.

What is claimed is:

1. An air fuel ratio controlling device for an internal combustion engine, comprising:

a NOx absorbent catalyst which is disposed in an exhaust system of an internal combustion engine, and which, in an exhaust gas-lean state, absorbs NOx in an exhaust gas, and, in an exhaust gas-rich state, reduces NOx which has been absorbed;

a three-way catalyst which is disposed in the exhaust system:

an air-fuel ratio detector which is disposed in the exhaust system;

an air-fuel ratio controller for controlling an air-fuel ratio of an air-fuel mixture being supplied to the engine, substantially to a stoichiometric air-fuel ratio based on an output of the air-fuel ratio detector, a NOx amount estimator for estimating an amount of NOx absorbed in said NOx absorbent catalyst based on an output of said air-fuel ratio detector during a period where the air-fuel ratio of the air-fuel mixture is controlled bv the air-fuel ratio controller; and an air-fuel ratio enricher for enriching the air-fuel ratio of the air-fuel mixture to a value which is richer than the richer air-fuel ratio that is controlled by the air-fuel ratio controller when the NOx amount, estimated by said NOx amount estimator, reaches a predetermined value during said period.

2. The air-fuel controlling device for an internal combustion engine as set forth in claim 1, wherein a proportional-integral control is performed by said air-fuel ratio controller such that said air-fuel ratio of the air-fuel mixture is switched to a leaner air-fuel ratio side or a richer air-fuel ratio side based on the output of the air-fuel ratio detector, and said air-fuel ratio of the air-fuel mixture is enriched until passing a predetermined period of time, regardless of said output when the NOx amount, estimated by said NOx amount estimator, reaches said predetermined value.

3. The air-fuel ratio controlling device for an internal combustion engine as set forth in claim 1, wherein said air-fuel ratio of the air-fuel mixture is enriched to a predetermined amount of the air-fuel ratio regardless of the output of the air-fuel ratio detector when the NOx amount, estimated by said NOx amount estimator, reaches said predetermined value, and said enriched air-fuel ratio is further gradually enriched.

* * * * *